United States Patent
Yamamoto et al.

[11] Patent Number: 5,385,972
[45] Date of Patent: Jan. 31, 1995

[54] FILLER-CONTAINING RESIN COMPOSITION AND STRETCHED FILMS USING SAME

[75] Inventors: Koji Yamamoto; Hajime Ikeno; Keiko Shichijo, all of Yokkaichi, Japan

[73] Assignee: Mitsubishi Petrochemical Co., Ltd., Tokyo, Japan

[21] Appl. No.: 166,076

[22] Filed: Dec. 14, 1993

[30] Foreign Application Priority Data

Dec. 28, 1992 [JP] Japan .................. 4-348304
Mar. 9, 1993 [JP] Japan .................. 5-048094

[51] Int. Cl.$^6$ .............. C08L 23/08; C08L 39/00; C08K 3/26; C08K 5/10
[52] U.S. Cl. .............. 524/579; 524/423; 524/427; 524/308; 524/310; 524/548; 524/570; 524/584; 524/586
[58] Field of Search ........... 524/423, 427, 570, 579, 524/583, 308, 310, 99, 584, 586, 548, 581

[56] References Cited

U.S. PATENT DOCUMENTS

| | | | |
|---|---|---|---|
| 3,105,057 | 9/1963 | Medalia | 524/579 |
| 4,039,507 | 7/1977 | Paige et al. | 524/579 |
| 4,604,421 | 8/1986 | Mitsuno et al. | 524/570 |
| 5,137,955 | 8/1992 | Tsuchiya et al. | 524/584 |
| 5,182,349 | 1/1993 | Okada et al. | 526/265 |

FOREIGN PATENT DOCUMENTS

| | | | |
|---|---|---|---|
| 0307116 | 3/1989 | European Pat. Off. | |
| 0500073 | 8/1992 | European Pat. Off. | |
| 0008235 | 1/1982 | Japan | 524/570 |
| 0045242 | 3/1983 | Japan | 524/579 |
| 0031550 | 2/1985 | Japan | 524/579 |

OTHER PUBLICATIONS

Database WPI, Derwent Publications Ltd., AN 87-075466, JP-A-62 027 438, Feb. 5, 1987.

*Primary Examiner*—Peter Szekely
*Attorney, Agent, or Firm*—Oblon, Spivak, McClelland, Maier & Neustadt

[57] ABSTRACT

A filler-containing resin composition containing component A, which is an ethylene copolymer having (a) a melt flow rate (MFR) of 0.01 to 20 g/10 min.; (b) a density D of not more than 0.935 g/cm$^3$; (c) a single peak of elution volume corresponding to a temperature within a range from 30 to 100° C. with the elution curve satisfying a relationship in which the ratio H/W is not less than 1 when H represents the height of the peak and W represents the width of the elution curve at $\frac{1}{2}$ H; and (d) an elution volume Y wherein (1) $Y \leq -4500D + 4105$ when the density D of the component A is less than 0.91 g/cm$^3$, but $Y \leq 100$; or (2) $Y \leq 10$ when the density D of the component A is not less than 0.91 g/cm$^3$; and component B, which is a particulate inorganic filler having an average particle size of not more than 10 μm, and a bulk density of 0.1 to 0.7 g/cm$^3$;

is provided which can be readily formed by stretching, and that is advantageously usable for the formation of thin formed bodies having excellent elastic recovery, strength and feeling, and also having very excellent gas-permeability.

21 Claims, 1 Drawing Sheet

FILLER-CONTAINING RESIN COMPOSITION AND STRETCHED FILMS USING SAME

BACKGROUND OF THE INVENTION

1. Field of the Invention

The present invention relates to a filler-containing resin composition that con be very readily for being formed by stretching, and that is advantageously usable for the formation of thin gas-permeable formed bodies which can exhibit excellent elastic recovery, strength and feeling, and very excellent gas-permeability when used as sanitary materials, or the formation of thin gas-permeable formed bodies which involve no smoking or roll staining when worked and are able to exhibit excellent gas-permeability, strength and weathering resistance when applied to outdoor uses. The present invention also relates to an stretched film formed by using such a filler-containing resin composition.

2Description of the Related Art

A known technique lot forming a gas-permeable film having through voids extending continuously through the thickness thereof comprises stretching, either uniaxially or biaxially, an unstretched film or the like formed of a composition containing an olefin-based resin and an inorganic filler. An stretched film formed by using such a composition is applied to various uses. For instance, the stretched film is used as a sanitary material for disposable paper diapers, etc., or as a material for an outdoor-use gas-permeable sheet (such as a protective sheet laid on the inside of roof tiles or outer walls of wooden constructions for the purpose of waterproofing and other weathering performance, or a protective sheet applied at the root, etc., of fruit trees or the like for the purpose of heat insulation, etc).

However, it has been difficult to form a conventional resin composition into a thin formed body because the composition does not have sufficient capability of being formed by orientation, nor does it have sufficient strength.

Although it has been desired that a resin composition be formed into thin forms for the purpose of saving resources, rationalizing production, etc., conventional resin compositions have not been quite able to meet such demands.

A film for disposable paper diapers or the like is required to have certain properties in addition to an adequately small thickness, which include good gas (typically, air or water vapor) permeability, and good hand or feeling. In recent years, it has been required that this kind of product have good fitting properties. In order to assure proper fit, a film used in the product must have elastic recovery.

Paper diapers, which are for absorbing liquids, must have good gas-permeability in order to avoid becoming stuffy. Products which may become stuffy are not welcomed by consumers. Further, consumers have recently come to demand products of higher quality than ever, and paper diapers are desirably capable of being closely fitted on the body as pants-type paper diapers are. In order to assure proper fit of paper diapers, a material capable of freely stretching and contracting (i.e., capable of exhibiting elastic recovery) is required. In addition, such a material must also have better feeling than ever.

Conventional gas-permeable sheets or films for outdoor use have insufficient properties with respect to gas (typically, air) permeability, strength, and the capability of being formed at an adequately small thickness. Furthermore, the conventional product has such insufficient weathering resistance that, when used in summer, the film or sheet deteriorates within one or two months, becoming totally useless. In order to improve weathering performance, the conventional practice includes adding agents for imparting weathering resistance (e.g., an ultraviolet screener, and a light stabilizer). However, this method involves many disadvantages. For instance, smoking may occur during forming, or the chill rolls may be contaminated with bled substances. Further, the thus obtained product may have such poor printability that ink in printed portions may easily come off, or the product may be vulnerable to contamination with dust, etc. Thus, conventional products have insufficient properties to be used as gas-permeable films for outdoor uses.

SUMMARY OF THE INVENTION

An object of the present invention is to provide a filler-containing resin composition that has good capability for being formed by stretching, and that is advantageously usable to form thin gas-permeable formed bodies having excellent elastic recovery, strength and feeling, and which also exhibit very excellent gas-permeability.

The present inventors have made various studies to overcome the above-described problems and disadvantages, finding that the object of the present invention can be achieved by blending together an ethylene-$\alpha$-olefin copolymer having specific properties and a specific inorganic filler. The present invention has been formulated on the basis of the above knowledge.

A filler-containing resin composition according to the present invention is characterized in that the resin composition contains component A and component B, specified as follows, at a proportion wherein the component A is contained in a first amount and the component B is contained in a second amount, the first amount being within a range of from 20 to 80% and the second amount being within a range of from 80 to 20% of the weight of the component A and the weight of the component B, respectively, with respect to the total weight of the component A and the component B.

Component A:

Component A is a copolymer of ethylene and $\alpha$-olefin having a carbon number of not less than 3, the component A having the following properties (a) to (d):

(a) a melt flow rate (MFR) of 0.01 to 20 g/10 min.;

(b) a density D of not more than 0.935 g/cm$^3$;

(c) a single peak of elution volume indicated by an elution curve obtained by temperature rising elution fractionation (TREF), the peak corresponding to a temperature within a range from 30° to 100° C., and the elution curve satisfying a relationship in which the ratio H/W is not less than 1 when H represents the height of the peak and W represents the width of the elution curve at half of the height H; and (d) an elution volume Y (in % of the weight thereof with respect to the total weight of the component A) at an elution temperature of 50° C. in temperature rising elution fractionation, the elution volume Y satisfying the following condition or :

$Y \leq -4500D + 4105$ when the density D of the component A is less than 0.91 g/cm$^3$, but $Y \leq 100$; or $Y \leq 10$ when the density D of the component A is not less than 0.91 g/cm$^3$.

Component B:

Component B is a particulate inorganic filler having an average particle size of not more than 10 μm, and a bulk density of 0.1 to 0.7 g/cm³.

BRIEF DESCRIPTION OF THE DRAWINGS

In FIG. 1, 1 indicates a filler, and 2 indicates a void.

DETAILED DESCRIPTION OF THE INVENTION

[I] Components

Figure 1:
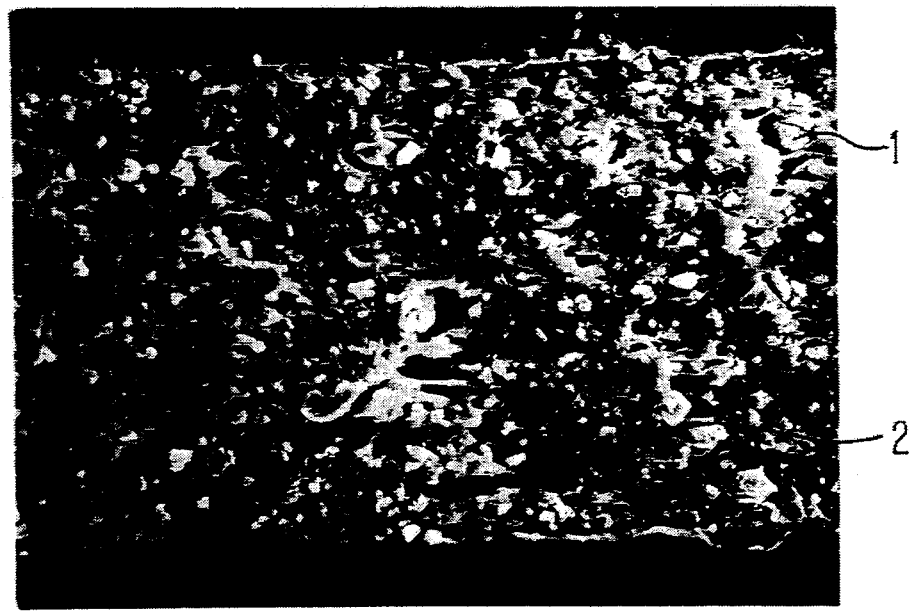
FIG. 1 is an electron micrograph (taken at a magnification of 2000 times) showing the structure of a cross-section of an stretched film formed of a filler-containing resin composition of Example 1 with a draw ratio of 3 times.

1. Component A (Copolymer of Ethylene and α-Olefin Having 3 or More Carbons)

(a) Properties of Component A

It is important that a copolymer of ethylene and olefin having 3 or more carbon atoms (such α-olefin will be referred to as C3 or more α-olefin unless otherwise specified) contained as component A in a filler-containing resin composition according to the present invention have the following properties (1) to (4), preferably (1) to (6):

(1) Melt Flow Rate

The copolymer of ethylene and C3 or more α-olefin used in the present invention should have a melt flow rate (MFR) within a range of from 0.01 to 20 g/10 min. as measured in accordance with Japanese Industrial Standards (JIS) K7210, preferably from 0.1 to 10 g/10 min., and more preferably from 0.5 to 5 g/10 min.

If the melt flow rate of the copolymer exceeds the upper limit of the range of from 0.01 to 20 g/10 min., film formation may become unstable. A melt flow rate less than the lower limit of this range is not practical because resin pressure may become so great as to reduce producibility.

(2) Density

The copolymer of ethylene and C3 or more α-olefin used in the present invention should have a density D of not more than 0.935 g/cm³ as measured in accordance with JIS K7112, preferably a density D within a range of from 0.86 to 0.930 g/cm³, more preferably from 0.88 to 0.925 g/cm³, and most preferably a density D of not less than 0.88 and less than 0.910 g/cm³.

If the density of the copolymer exceeds 0.935 g/cm³, the tensile strength and feeling of an stretched film may be insufficient. If the copolymer has too small a density, blocking may occur on the surface of a formed film, thereby rendering the film unusable.

(3) Temperature at the Peak of Elution Curve Obtained by Temperature Rising Elution Fractionation The copolymer of ethylene and C3 or more α-olefin used in the present invention should have a single peak of an elution curve obtained by temperature rising elution fractionation (TREF). The peak should correspond to a temperature within a range of from 30° to 100° C., preferably from 35° to 85°, and more preferably from 40° to 75° C.

If the peak of the elution curve corresponds to a temperature exceeding 100° C., the resultant form may have poor elastic recovery, thereby becoming unusable. A peak corresponding to a temperature less than 30° C. is not preferable because gas-permeability may be insufficient.

The elution curve should also satisfy a relationship in which the ratio H/W of the height H of the peak with respect to the width W of the elution curve at half of the height H is not less than 1, preferably within a range of from 1 to 20, more preferably from 1 to 15, even more preferably from 1 to 10, and most preferably from 1 to 5.

If the ratio H/W is less than 1, the copolymer may contain a not negligible amount of components that cause blocking, and the resultant form may have impaired sealability after the passage of a long time, thereby becoming unusable.

(4) Elution Volume at Elution Temperature of 50° C. in Temperature Rising Elution Fractionation The copolymer of ethylene and C3 or more α-olefin used in the present invention should have a specific elution volume Y (in percentage of the weight thereof with respect to the total weight of the component A) at an elution temperature of 50° C. in temperature rising elution fractionation, the elution volume Y satisfying the following condition or:

$Y \leq -4500D + 4105$, preferably $Y \leq -4650D + 4238$ when the density D of the component A is less than 0.91 g/cm³, but $Y \leq 100$; or $Y \leq 10$, preferably $Y \leq 7$ when the density D of the component A is not less than 0.91 g/cm³.

Obtaining Elution Curve by Temperature Rising Elution Fractionation

The elution volume of the copolymer used as component A in the present invention is measured by temperature rising elution fractionation (TREF) performed in the following manner on the basis of the principles described in, for example, "Journal of Applied Polymer Science" (Vol. 26, pages 4217 to 4231, 1981) or "Drafts for Symposium on Polymers" (2P1C09, 1985).

In principle, TREF of a polymer is performed as follows: a polymer to be measured is completely dissolved in a solvent. Thereafter, the resultant solution is cooled, so that a thin polymer layer is formed on the surface of an inactive carrier. In the polymer layer, those components of the polymer which crystallize easily are on the inner side (the side of the layer close to the surface of the inactive carrier) while components which do not crystallize easily are on the outer side.

When temperature is raised continuously or in a stepwise manner, elution occurs, starting with the non-crystalline components of the relevant polymer, that is, those short-chain branches of the polymer having relatively high degrees of branching, these polymer components being eluted in low-temperature stages. As the temperature increases, those portions having lower branching degrees are eluted gradually. Finally, the branchless straight-chain portion is eluted, thereby completing TREF.

The concentrations of fractions eluted at each temperature are detected, and each elution volume is plotted against elution temperatures to obtain an elution curve in a graphical representation. Such an elution curve enables the component distribution of the polymer to be determined.

(5) Q Value

The copolymer of ethylene and C3 or more α-olefin used in the present invention should preferably have a specific Q value (the ratio Mw/Mn of the weight-average molecular weight Mw with respect to the number-average molecular weight Mn) obtained by size exclusion chromatography (SEC), the Q value being not more than 4, preferably not more than 3, and more preferably-not more than 2.5. If the ethylene-α-olefin copolymer has a Q value as specified above, this enables great tensile strength.

(6) Amount of Components Extracted with n-Hexane at Boil

When a filler-containing resin composition according to the present invention is to be used as a material for producing sheets or the like for outdoor uses, a copolymer of ethylene and C3 or more α-olefin contained as component A in the resin composition should preferably have a specific amount of components extracted within-hexane at boil, the amount being not more than 20% of the total weight of the component A, preferably not more than 15% by weight, and more preferably not more than 10% by weight. If the amount of components extracted with n-hexane at boil (hereinafter abbreviated to extraction with n-hexane at boil) exceeds 20% by weight, an stretched film may have impaired gas-permeability.

(b) Preparation of Copolymer of Ethylene and C3 or More α-Olefin

A copolymer of ethylene and C3 or more α-olefin used in the present invention may be prepared by copolymerizing the main component, ethylene, and the sub-component, α-olefin, by using a metallocene catalyst, in particular, a metallocene-alumoxane catalyst or a catalyst such as that disclosed, e.g., in International Patent Laid-Open No. W092/01723, comprising a mixture of a metallocene compound and a compound, such as one described below, capable of forming a stable anion by reacting with a metallocene compound. A preparation method disclosed, for example, in any of the following publications-may be used: Japanese Patent Laid-Open Nos. 58-19309, 59-95292, 60-35005, 60-35006, 60-35067, 60-35008, 60-35009, 61-130314, and 3-163088; European Patent Laid-Open No. 420436; U.S. Pat. No. 5055438; and International Patent Laid-Open No. W091/04257.

The above-stated compound capable of forming a stable anion by reacting with a metallocene compound is either an ionic compound having ion pairs of cations and anions, or an electrophilic compound. Such a compound forms a stable ion by reacting with a metallocene compound, thereby providing an active species for polymerization.

The above ionic compound is expressed by the following general formula (II):

$[Q]^{m+}$ $[Y]^{m-}$ (m being an integer of 1 or greater)  (II)

In the formula (II), Q represents a cation component of the ionic compound. The cation component may be, for example, carbonium cation, tropylium cation, ammonium cation, oxonium cation, sulfonium cation or phosphonium cation. Also, the cation component may be a metallic cation or an organometallic cation, which cation itself can be easily reduced.

The cation component may be a cation which can give away proton(s), as disclosed in Japanese Patent Publication No. 1-501950, or a cation which does not give away proton(s). Specific examples of cations of the second type include triphenylcarbonium, diphenylcarbonium, cycloheptatrienium, indenium, triethylammonium, tripropylammonium, tributylammonium, N,N-dimethylanilinium, dipropylammonium, dicyclohexylammonium, tripheylphosphonium, trimethylphosphonium, tri(dimethylphenyl)phosphonium, tri(methylphenyl)phosphonium, triphenylsulfonium, triphenyloxonium, triethyloxonium, pyrylium, silver ion, gold ion, platinum ion, palladium ion, mercury ion, and ferrocenium ion.

In the above formula (II), Y represents an anion component of the ionic compound which is transformed into a stable anion through reaction with a metallocene compound. The anion component may be, for example, organic boron compound anion, organic aluminum compound anion, organic gallium compound anion, organic phosphorus compound anion, organic arsenic compound anion or organic antimony compound anion. Specific examples of such anions include tetraphenyl boron, tetrakis(3,4,5-trifluorophenyl) boron, tetrakis(3,5-di(trifluoromethyl)phenyl) boron, tetrakis(3,5-(t-butyl)phenyl) boron, tetrakis(pentafluorophenyl) boron, tetraphenyl aluminum, tetrakis(3,4,5-trifluorophenyl) aluminum, tetrakis(3,5-di(trifluoromethyl)phenyl) aluminum, tetrakis(3,5-di(t-butyl)phenyl) aluminum, tetrakis(pentafluorophenyl) aluminum, tetraphenyl gallium, tetrakis(3,4,5-trifluorophenyl) gallium, tetrakis(3,5-di(trifluoromethyl)phenyl) gallium, tetrakis(3,5-di(t-butyl)phenyl) gallium, tetrakis(pentafluorophenyl) gallium, tetraphenyl phosphorus, tetrakis(pentafluorophenyl) phosphorus, tetraphenyl arsenic, tetrakis(pentafluorophenyl) arsenic, tetraphenyl antimony, tetrakis(pentafluorophenyl) antimony, decaborate, undecaborate, carbadodecaborate, and decachlorodecaborate.

As stated above, an electrophilic compound may be used instead of an ionic compound, the electrophilic compound comprising a certain kind of Lewis acid capable of forming a stable anion by reacting with a metallocene compound so as to provide an active species for polymerization. The electrophilic compound may be, for example, a halogenated metal compound of varying type, or a metal oxide known as a solid acid. Specifically, halogenated magnesium, inorganic oxides of the Lewis-acid type, or the like may be used.

α-Olefin

α-Olefin having a carbon number of 3 or greater, which serves as the sub-component of the copolymer, may comprise, for example, propylene, 1-butene, 1-pentene, 1-hexene, 1-octene, 1-heptene, 4-methylpentene-1, 4-methylhexene-1, 4,4-dimethylpentene-1, or octadecene. Among α-olefins having a carbon number of 3 or greater, those having a carbon number of 4 to 12 are preferable, and those having a carbon number of 6 to 10 are more preferable. It is preferable that 2 to 60% by weight (percentages by weight will hereinafter be abbreviated to wt %), preferably 5 to 50 wt %, of one or more such α-olefins be copolymerized with 40 to 98 wt %, preferably 50 to 95 wt %, of ethylene.

Copolymerization of Ethylene and C3 or More α-Olefin

Methods which may be used to copolymerize ethylene and C3 or more α-olefin comprise, for example, gaseous phase methods, slurry methods, solution methods or high-pressure ion polymerization methods. Among these, solution methods and high-pressure ion polymerization methods are preferable, with preparation by high-pressure ion polymerization methods being particularly preferable.

The above-mentioned high-pressure ion polymerization method is a method for continuous production of an ethylene-based polymer, such as that disclosed, e.g., in Japanese Patent Laid-open No. 56-18607 or 58-225106, and the method adopts reaction conditions comprising a pressure of not less than 200 kg/cm², preferably a pressure within a range of from 300 to 2000 kg/cm², and a temperature of not less than 125° C., preferably a temperature within a range of from 130° to 250° C., and more preferably from 150° to 200° C.

2. Component B (Particulate Inorganic Filler)
   (a) Properties of Component B

It is important that a particulate inorganic filler serving as component B, or the filler, of a filler-containing resin composition according to the present invention have the following properties a. and b., preferably a, b, and c:

a. Average Particle Size

A particulate inorganic filler used as component B in the present invention should have an average particle size of not more than 10 μm, preferably not more than a dimension within a range of from 0.1 to 5 μm, and more preferably not more than a dimension within a range of from 0.5 to 2 μm.

The average particle size of a particulate inorganic filler to be used in the present invention is obtained by measuring the specific surface area of the filler by an air permeation method, and calculating an average particle size dm by the following equation:

$$dm = 60000/(\rho \cdot Sw)$$

where dm: average particle size (μm) of filler
$\rho$: true specific gravity (g/cm³) of filler
Sw: specific surface area (cm²/g) of filler The specific surface area of the filler may be measured by using, for example, a specific surface area measuring apparatus ("SS-100" (trade name); produced by Shimazu Seisakusho K.K.), and the Kozeny-Carman equation.

If the particulate inorganic filler has too large an average particle size, the outer appearance of an stretched film may be spoiled. In addition, when forming a relatively thin stretched film having a thickness of 100 μm or smaller, unwanted hole formation or uneven stretching may occur, making it impossible to perform stable stretching.

b. Bulk Density

A particulate inorganic filler used as component B in the present invention should have a bulk density within a range of from 0.1 to 0.7 g/cm³ as measured in accordance with JIS K5101, preferably from 0.2 to 0.6 g/cm³, and more preferably from 0.3 to 0.5 g/cm³.

Too small a bulk density of the particulate inorganic filler reduces the gas-permeability of an stretched film. Too large a bulk density of the filler reduces the strength of a film so that the film may become unusable.

c. Water Content

A particulate inorganic filler used as component B in the present invention should preferably have a water content of not more than 3000 ppm, preferably not more than 1000 ppm.

If the particulate inorganic filler has a water content exceeding 3000 ppm, foaming tends to occur during formation, As a result, stable formation of a film may become difficult. In addition, there is a tendency of the outer appearance, such as the hue, of the film or the like being impaired, or the filler undergoing secondary agglomeration, thereby involving higher risks of impaired outer appearance, or unsuccessful stretching.

A particulate inorganic filler contained as component B in a resin composition according to the present invention may comprise, for example, calcium carbonate, calcium oxide, zeolite, non-crystalline aluminosilicate, clay, synthetic silica, titanium oxide, alumina, barium sulfate, aluminum sulfate, or magnesium hydroxide. Among these substances, calcium carbonate, zeolite, non-crystalline aluminosilicate, barium sulfate, synthetic silica and magnesium hydroxide are preferable, and more preferable are calcium carbonate and barium sulfate. A single one of these substances or a mixture of two or more of the substances may be used.

3. Component C (Dispersing Agent)

A filler-containing resin composition according to the present invention basically contains component A and component B, described above. However, a resin composition according to the present invention may additionally contain, as component C, a dispersing agent for the particulate inorganic filler, the dispersing agent being contained in an amount of 0.1 to 15 parts by weight, preferably from 0.5 to 7 parts by weight, and more preferably from 1 to 5 parts by weight, per 100 parts by weight of the total amount of the component A and the component B.

The dispersing agent may comprise a substance in the form of a liquid or wax which is selected from among substances such as the following: an ester of a saturated or unsaturated fatty acid having 9 to 40 carbon atoms; a triglyceride formed by using a saturated or unsaturated fatty acid having 2 to 30 carbon atoms; a liquid or wax-like polyhydroxy saturated hydrocarbon formed by hydrogenating liquid polybutadiene having a terminal hydroxyl group; a liquid or wax-like mixture of either a hydrocarbon polymer or hydrocarbon copolymer and an organic compound having an epoxy group; a titanic acid ester; a univalent higher alcohol or its derivative, a higher fatty acid amide; a higher amine; and an alcohol derivative derived from a saturated or unsaturated alcohol with a valence of 2 or greater, such as a monopolymer, copolymer, ether, amine, amide or ester of the alcohol. A single one of these substances or a mixture of two or more of the substances may be used.

Among the above-listed substances, it is preferable to use an ester of a saturated or unsaturated fatty acid having 9 to 40 carbon atoms, a triglyceride formed by using a saturated or unsaturated fatty acid having 2 to 30 carbon atoms, or a liquid or wax-like polyhydroxy saturated hydrocarbon formed by hydrogenating liquid polybutadiene having a terminal hydroxyl group. More preferable is the use of an ester of a saturated or unsaturated fatty acid having 9 to 40 carbon atoms.

Ester of Unsaturated Fatty Acid

Specific examples of esters of unsaturated fatty acids which may be used, include (poly)ethylene glycol oleate, (poly) propylene glycol oleate, glyceryl oleate, sorbitan oleate, (poly)ethylene glycol sorbitan oleate, butyl oleate, pinacol oleate, m-cresol oleate, pentaerythritol oleate, glyceryl linoleate, glyceryl ricinoleate, methyl ricinoleate, ethyl ricinoleate, butyl ricinoleate, methyl acetylricinoleate, ethyl acetylricinoleate, butyl acetylricinoleate, (poly)ethylene glycol ricinoleate, glyceryl acetylricinoleate, and glyceryl eruciate.

Among these examples, a glyceryl hydroxy unsaturated fatty acid ester, particularly, glyceryl ricinoleate, and more particularly, glyceryl triricinoleate, is preferable.

Ester of Saturated Fatty Acid

Specific examples of esters of saturated fatty acids which may be used, include (poly)ethylene glycol laurate, (poly)propylene glycol laurate, glyceryl laurate, sorbitan laurate, glyceryl myristate, glyceryl palmitate, butyl stearate, ethylene glycol stearate, propylene glycol stearate, pinacol stearate, m-cresol stearate, (poly) ethylene glycol stearate, (poly) propylene glycol stearate, glyceryl stearate, pentaerythritol stearate, sorbitan stearate, (poly) ethylene glycol sorbitan stearate, methyl hydroxystearate, ethyl hydroxystearate, butyl hydroxystearate, methyl acetyl hydroxystearate, ethyl acetyl hydroxystearate, butyl acetyl hydroxystearate, ethylene glycol hydroxystearate, propylene gylcol hydroxystearate, pinacol hydroxystearate, m-cresol hydroxystearate, (poly) ethylene glycol hydroxystearate, (poly)propylene glycol hydroxystearate, pentaerythritol hydroxystearate, sorbitan hydroxystearate, ethylene glycol sorbitan hydroxystearate, glycerin hydroxystearate, and glyceryl acetyl hydroxystearate.

Among these examples, a glyceryl hydroxy saturated fatty acid ester, such as ethylene glycol hydroxystearate, propylene gylcol hydroxystearate, pinacol hydroxystearate, m-cresol hydroxystearate, (poly)ethylene glycol hydroxystearate, (poly)propylene glycol hydroxystearate, pentaerythritol hydroxystearate, sorbitan hydroxystearate, ethylene glycol sorbitan hydroxystearate, glycerin hydroxystearate or glyceryl acetyl hydroxystearate, is preferable.

Particularly, glyceryl hydroxystearate is preferable. More particularly, glyceryl tri-12-hydroxystearate is preferable.

When using a fatty acid ester, the use of a saturated ester is more advantageous than the use of an unsaturated ester in that substantially no smoking occurs during forming. In addition, the thus obtained oriented film has excellent non-odor property.

When a dispersing agent for the particulate inorganic filler is added as component C, it is possible to greatly improve the dispersibility of the particulate inorganic filler, that is, component B, in the polymer, thereby enabling corresponding improvement in the property with which a film can be oriented, so that the film can be adequately thin. This in turn makes it possible for the film to have good gas-permeability, and good feeling with improved soft quality.

4. Component D
(Copolymer of Ethylene and Cyclic Aminovinyl Compound)

A filler-containing resin composition according to the present invention basically contains component A and component B, as described above. However, a resin composition according to the present invention may additionally contain, as component D, a copolymer of ethylene and a cyclic aminovinyl compound. The cyclic aminovinyl compound is expressed by the following general formula (I):

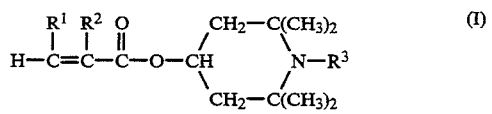

where $R^1$ and $R^2$ represent a hydrogen atom or a methyl group, and $R^3$ represents a hydrogen atom or an alkyl group having to 4 carbon atoms.

The addition of component D enables the resin composition to impart properties such as weathering resistance and printability when the intended uses are outdoor or the like where weathering performance is required. In addition, the addition of component D prevents smoking and roll staining during working. Thus, it is possible to obtain a product which has very high utility.

Typical examples of cyclic aminovinyl compounds expressed by the general formula (I) include the following:

1) 4-acryloyloxy-2,2,6,6-tetramethylpiperidine;
2) 4-acryloyloxy-1,2,2,6,6-pentamethylpiperidine;
3) 4-acryloyloxy-1-ethyl-2,2,6,6-tetramethylpiperidine;
4) 4-acryloyloxy-1-propyl-2,2,6,6-tetramethylpiperidine;
5) 4-acryloyloxy-1-butyl-2,2,6,6-tetramethylpiperidine;
6) 4-methacryloyloxy-2,2,6,6-tetramethylpiperidine;
7) 4-methacryloyloxy-1,2,2,6,6-pentamethylpiperidine;
8) 4-methacryloyloxy-1-ethyl-2,2,6,6-tetramethylpiperidine;
9) 4-methacryloyloxy-1-butyl-2,2,6,6-tetramethylpiperidine;
10) 4-crotonoyloxy-2,2,6,6-tetramethylpiperidine; and
11) 4-crotonoyloxy-1-propyl-2,2,6,6-tetramethylpiperidine.

Copolymerization of Component D

A copolymer of ethylene and a cyclic aminovinyl compound used as component D in the present invention contains an amount of cyclic aminovinyl compound such that the number of moles of the cyclic aminovinyl compound is less than 1% of the total number of moles of the copolymer serving as component D, preferably within a range of from 0.1 to 0.7 mole %.

A copolymer used as component D in the present invention has a melt flow rate within a range of from 0.1 to 200 g/10 min., preferably from 0.5 to 100 g/10 min., and more preferably from 0.7 to 50 g/10 min.

A copolymer to serve as component D may be prepared by a high-pressure radical-polymerization method disclosed, e.g., in Japanese Patent Laid-Open No. 4-80215, specifically, by radical-polymerizing together ethylene and a cyclic aminovinyl compound at a pressure of 1000 to 5000 kg/cm² and at a temperature of 100° to 400 C.

[II] Proportion of Components A and B and

Amounts of Components C and D in Resin Composition

A filler-containing resin composition according to the present invention should contain component A and component B, as described above, at a proportion of A: B=20 to 80 wt % 80 to 20 wt %, in which component A is contained in a first amount within a range of from 20 to 80% and component B is contained in a second amount within a range of from 80 to 20% of the individual weights of components A and B with respect to the total weight of the component A and component B. Preferably, component A and component B are contained in the resin composition in amounts within ranges of from 30 to 70 wt % and from 70 to 30 wt %, respectively. More preferably, component A is contained in an amount ranging from 35 to 60 wt % while component B is contained in an amount ranging from 65 to 40 wt %.

If component B is contained in too small an amount outside of the above range, an stretched film may have impaired feeling. If component B is contained in too large an amount outside of the above range, the ability of a film to be stretched during its formation is impaired, making the film somewhat unusable.

When component C (dispersing agent) is additionally contained, the component C is contained in an amount within a range of from 0.1 to 15 parts by weight, preferably from 0.5 to 7 parts by weight, and more preferably from 1 to 5 parts by weight, per 100 parts by weight of the total amount of component A and component B also contained in the resin composition.

If the amount of component C is too small, an stretched film formed with a small thickness and with a low draw ratio may suffer from local necking, and thus have non-uniform thickness, or may have mottles, whereby the value of the film is greatly reduced. If the amount of component C is too large, workability is impaired; in addition, the gas-permeability of an stretched film is impaired, making the film somewhat unusable.

When component D (a copolymer of ethylene and a cyclic aminovinyl compound) is additionally contained, the component D is contained in an amount at which cyclic aminovinyl compound units in the copolymer serving as component D weigh from 0.05 to 5%, preferably from 0.1 to 3% and more preferably from 0.1 to 1%, of the total weight of that resin composition.

If the amount of cyclic aminovinyl compound units of component D is too small, weathering resistance may be insufficient, or printability may not be improved sufficiently. If the amount of cyclic aminovinyl compound units of component D is too large, a formed film may have insufficient strength, thereby becoming somewhat unusable.

[III] Production of Filler-containing Resin Composition

1. Mixing

A filler-containing resin composition according to the present invention is produced by mixing together a copolymer of ethylene and C3 or more α-olefin, serving as component A, and a particulate inorganic filler, serving as component B and having an average particle size of not more than 10 82 m and a bulk density of 0.1 to 0.7 g/cm$^3$, and, when required, by mixing together, in addition to such components A and B, a dispersing agent, serving as component C, and/or a copolymer of ethylene and a cyclic aminovinyl compound, serving as component D. For this purpose, a method similar to a conventional method for the production of a resin composition may be used.

Specifically, required components are mixed together sufficiently with a blender such as a Henschel mixer. When desired, the mixture of components is mixed with other additives, such as those described below. Then, the resultant mixture is melted and kneaded by using a biaxial kneader-extruder, a Banbury mixer, a kneader-blender or the like, to thereby obtain a resin composition according to the present invention. The thus obtained resin composition is normally formed into a pellet by a commonly used method.

In the above production, although the order in which individual components are entered into the final mixture is not specified basically, when component D is to be included, it is preferable that component D is first mixed with component A, and then component B mixed with the first mixture. Alternatively, component D may be included by mixing component A with a master batch previously prepared containing components B and D, or by mixing component D with a master batch previously prepared containing components A and B.

2 Other Additives

A filler-containing resin composition according to the present invention may contain auxiliary additives other than the dispersing agent described above, and generally used in a resin composition. Such additives include an antioxidant, a heat stabilizer, a light stabilizer, an ultraviolet absorber, a neutralizer, a lubricant, an anti-fogging agent, an anti-blocking agent, an antistatic agent, a slip agent, and/or a colorant.

A resin or rubber component, such as an ethylene-a olefin copolymer different from component A, a high-pressure processed low-density polyethylene, high-density polyethylene, polypropylene, polybutene, or ethylene-vinyl acetate copolymer, may be used in the present invention so long as the component is contained in an amount within a range that does not involve any substantial reduction in the effects achievable with the present invention.

[IV] Forming of Stretched Film

A filler-containing resin composition according to the present invention may be used to form a filler-containing stretched film by a normal method in which the resin composition is extruded in its molten state, and the extruded resin composition is uniaxially stretched.

Such a stretched film may be formed by a general method for the formation of a stretched film, such as inflation forming or T-die film forming.

Specifically, a filler-containing resin composition is melt-extruded at a temperature equal to or lower than the melting point of the composition, and the extruded composition is either uniaxially or biaxially stretched, thereby obtaining a stretched film. Uniaxial orientation may be, for example, roll stretching of the composition in its flat state, oven stretching, or stretching in a tube state. Biaxial stretching may be, for example, tentor stretching in a flat state, inflation stretching in a tube state, or mandrel stretching. A draw ratio within a range of from 1.2 to 6 times, preferably 1.2 to 4 times, may be used.

Figure 2:
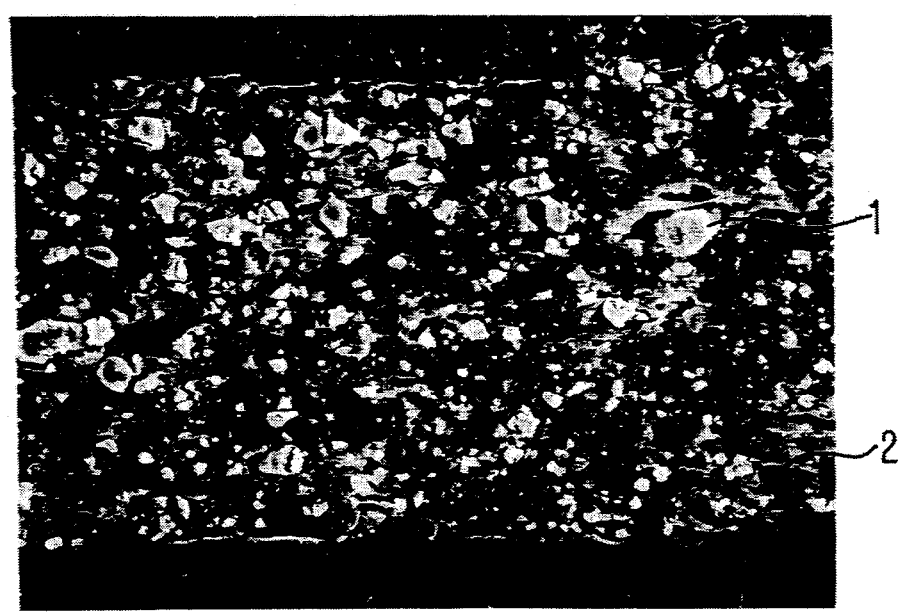
FIG. 2 is an electron micrograph (taken at a magnification of 2000 times) showing the structure of a cross-section of an stretched film-formed of a filler-containing resin composition of Comparative Example 3 with a draw ratio of 3 times.

When a stretched film formed of a filler-containing resin composition according to the present invention is sectioned along the machine direction (MD), and the cross-section is observed, a larger number of fine voids which extend continuously through the cross-section, are uniformly distributed in the cross-section than in a similar cross-section of a stretched film formed of a conventional filler-containing resin composition, and accordingly, the cross-section has a smaller area of that portion containing no voids and being made of only resin than a conventional cross-section (see FIGS. 1 and 2). If the voidless area is large, or if voids do not extend continuously from one surface of the film to the other surface, the gas-permeability of the film may be very poor. This risk, however, is prevented in the case of a stretched film formed of a filler-containing resin composition according to the present invention.

This feature of a stretched film formed of a filler-containing resin composition according to the present invention enables the film to be advantageously used as a sanitary material for paper diapers, sanitary goods, medical wear, etc., or a material for weather protective sheets for wood structures, protective sheets for trees, etc.

One of the characteristic properties of a stretched film formed of a filler-containing resin composition according to the present invention that indicates good gas-permeability of the stretched film, is its great void area ratio.

Void area ratio is an average void area per 100 μm² of a cross-section of an stretched film, the cross-section being taken in a direction parallel to the machine direction.

A void area ratio is measured in the following manner:

A film formed by orienting a filler-containing resin composition extruded in its molten state, is cut into a piece of a suitable size (e.g., a piece of 10 mm×20 mm), and the piece is embedded in an epoxy resin. The resultant sample is cooled to a temperature of approximately −2.3° C., and sectioned vertically in a direction parallel to the machine direction. The thus obtained cross-section is coated with platinum-palladium with a thickness of 15 to 20 nm. The coated surface is observed with a scanning electron microscope at an acceleration voltage of 10 kV and at a magnification of 2000 times, and an electron micrograph of the surface is obtained.

On the basis of the thus-obtained micrograph, the area of voids within a total area of 10 μm square (100 μm²) is calculated. Such void areas with respect to several (about six to ten) different sites are measured, and the average of the void areas is calculated as the void area ratio of the sample.

The present invention will be described more specifically by examples thereof.

[I] Methods for Property Measurement and Evaluation

Before entering into the description of the examples of the present invention and comparative examples, which will be given in section [II], certain methods used to measure various properties of these examples and to evaluate these examples will be outlined.

1. Methods for Property Measurement (a) Melt Flow Rate: JIS K7210

(b) Density: JIS K7112

(c) Elution Curve: In the present invention, the peak of an elution curve obtained by temperature rising elution fractionation (TREF) is checked. TREF is performed in principle as follows: The relevant polymer is completely dissolved in a solvent at a high temperature. Thereafter, the resulting solution is cooled, so that a thin polymer layer is formed on the surface of an inactive carrier. Then, temperature is raised continuously or in a stepwise manner, and eluted fractions of the polymer are collected. The concentrations of fractions eluted at each temperature are successively detected, and each elution volume is plotted against elution temperatures to obtain an elution curve in a graphical representation. The component distribution of the polymer can be determined on the basis of the elution curve. In the present invention, the peak of such an elution curve is checked.

An elution curve of a sample is obtained in the following manner:

The apparatus used for measurement is a cross fractionating apparatus ("CFC T150A" (trade name); produced by Mitsubishi Petrochemical Co.,Ltd.), and measurement is performed in accordance with the method described in an operation manual attached to the apparatus.

The cross fractionating apparatus includes two on-line connected sections, that is, a temperature rising elution fractionation (TREF) mechanism for fractionating a sample by utilizing differences in dissolution temperature between various portions thereof, and a size exclusion chromatography (SEC) section for separating each fractionated portion by the size of molecules.

First, a sample (ethylene-α-olefin copolymer) to be measured is dissolved in a solvent of o-dichlorobenzene at a temperature of 140° C. to prepare a sample solution having a sample concentration of 4 mg/ml. The sample solution is charged into the sample loop of the apparatus. Thereafter, the apparatus automatically performs measurements at set conditions.

0.4 ml of the sample solution retained in the sample loop is fed to a TREF column (a stainless-steel column attached to the apparatus, the column being filled with glass beads serving as an inactive carrier, and having an inner diameter of 4 mm and a length of 150 mm). Then, the fed sample is cooled from 140° C. to 0° C. at a cooling speed of 1° C./min., thereby causing the sample to be coated on the surface of the inactive carrier. In this process, a polymer layer is formed on the surface of the inactive carrier in such a manner that components which are relatively highly crystalline (components capable of being crystallized easily) enter first into the layer, and then components which are relatively lowly crystalline (components not capable of being crystallized easily) add to the layer. After the TREF column has been held at 0° C. for 30 min., a 2-ml fraction eluted at 0° C. is fed from the TREF column to a SEC column unit comprising three SEC columns ("AD80M/S" (trade name); produced by Showa Denko K.K.) at a flow rate of 1 ml/min.

While the SEC section performs separation by molecular size, the temperature of the TREF column is raised to a subsequent elution temperature (5° C., in this case), and maintained at this temperature for approximately 30 min. Thus, the SEC column unit subsequently performs the separation of each eluted fraction at a cycle of 39 min. The elution temperature is raised stepwise from 0° C. to 5°, 10°, 15°, 20°, 25°, 30°, 35°, 40°, 45°, 49°, 52°, 55°, 58°, 61°, 64°, 67°, 70°, 73°, 76°, 79°, 82°, 85°, 88°, 91°, 94°, 97°, 100°, 102°, 120°, and 140° C.

The portions of the sample solution separated by the SEC column unit by molecular size are processed by an infrared spectrophotometer attached to the apparatus. The infrared spectrophotometer measures, through detection with a wavelength of 3.42 μ on the basis of stretching vibration of methylene, the absorbance of each separated portion that corresponds to the concentration of the polymer in the particular portion. Thus, chromatograms concerning individual fractions eluted at various elution temperatures are obtained.

Thereafter, data processing softwear provided in the apparatus is used. Specifically, a base line is drawn in each of the chromatograms resulting from the above measurement, and the following calculations are performed: The individual areas of the chromatograms are integrated, and an integral elution curve is obtained. Further, the integral elution curve is differentiated with respect to temperature, thereby obtaining a differential elution curve. The graphs resulting from these calculations are output to a printer connected with the apparatus.

In the thus output graph of the differential elution curve, the abscissa represents the elution temperature with a dimension of 89. 3 mm of the abscissa corresponding to a change through 100°, and the ordinate represents the differential elution volume with a dimension of 76.5 mm of the ordinate corresponding to a change through 0.1 when the entire integral elution volume is 1.0 and each differentiated quantity consists of a change in elution volume with a change in temperature by 1° C. The height H in millimeters of the peak of the differential elution curve is divided by the width W in millimeters of the curve at half of the height H, thereby calculating the ratio H/W of the differential elution curve of the particular sample.

(d) Q Value: An apparatus for size exclusion chromatography (SEC) is used for measuring each Q value (weight-average molecular weight/number-average molecular weight) under the conditions shown below. In this measurement, a universal calibration curve is obtained by using monodisperse polystyrene, and the molecular weights are calculated as those of straight-chain polyethylene:
Apparatus type: Waters Model 150C GPC
Solvent: o-dichlorobenzene
Flow rate: 1 ml/min.
Temperature: 140° C.
Measurement concentration: 2 mg/ml
Charged amount: 200-μl
Columns: three columns ("AD80M/S" (trade name); produced by Showa Denko K.K.)

(e) Average Particle Size: The average particle size of each sample (component B) is measured by a coulter counter method in which dispersion is performed by using a 28KC ultrasonic wave for 5 minutes, and 0.01-% sodium hexametaphosphate.

(f) Bulk Density: JIS-K5101

(g) Extraction with n-Hexane at Boil: 5 g of each film extruded by air-cooled inflation at a temperature of 200° C. with a film thickness of 300 μm is placed in a thimble. Then, a Soxhlet extractor charged with 200 ml of normal hexane, is used to perform extraction for eight hours at the boiling point of hexane. After the resultant thimble with its contents is dried for 60 minutes with a vacuum drier, the amount by which the total weight of the thimble and its contents before extraction is reduced after the extraction is measured as the extraction with n-hexane at boil of the relevant sample.

2. Methods for Evaluation
(a) Tensile Strength Elongation: ASTM-D882-67
(b) Elastic Recovery; Each sample film is stamped into a dumbbell-shaped tensile test piece having a gauge length of 10 mm and a width of 5 mm. The piece is subjected to two cycles of 100%-elongation at a tensile test speed of 500 mm/min. Then, the gauge length $l_1$ (mm) after elongation is measured to calculate the elastic recovery (%) of the sample by the following equation:

$$\text{Elasticity recovery} = \frac{\{l_1 \text{ (mm)} - 10 \text{ (mm)}\}}{10 \text{ (mm)}} \times 100 \text{ (\%)}$$

(c) Water Vapor Permeability: JIS Z0208
(d) Weathering Resistance: Each sample film is made into a test piece, and the elongation of the test piece is measured. Then, ultraviolet light is cyclically radiated onto the test piece under the following conditions, and the tensile strength of the test piece after each radiation cycle is measured. The period of time (hours) required for the test piece to have half the initial elongation thereof is measured as the weathering resistance of the sample.
Apparatus: Sunshine Weathermeter (produced by Suga Shikenki K.K.)
Temperature: Adjusted within a rage of 63°±3° C. by using a black panel
Light source: Arranged for radiation of ultraviolet light through a glass filter
Radiation cycle: Cycle of 60 min. consisting of 12 min. using water and 48 min. using no water
(e) Printability: The wet strength of each sample film is measured.
(f) Void Area Ratio: Measurement is performed in the manner described above.

EXAMPLE 1

Preparation of Copolymer of Ethylene and C3 or More α-Olefin (Component A)

A catalyst was prepared using the method described in Japanese Patent Laid-Open No. 61-130314. Specifically, 2.0 millmols of complex ethylene-bis(4, 5, 6, 7-tetrahydroindenyl)zirconium dichloride was mixed with methyl alumoxane (produced by Toyo Stauffer K.K.) in an amount of 1000 times the molar amount of the complex, and the resultant mixture was diluted in toluene to prepare 10 liters of a catalyst solution. Then, polymerization was performed in the following manner by using the catalyst.

A mixture of ethylene and 1-hexene was supplied into an agitation autoclave type continuous reactor having an inner volume of 1.5 liters in such a manner that the proportion of 1-hexene as 80% of the total weight of the mixture. The pressure within the reactor was maintained at 1000 kg/cm$^2$, and reaction was performed at 160° C.

After the reaction had completed, an ethylene-α-olefin copolymer (containing 1-hexene in an amount of 16% of the total weight of the copolymer) which was to serve as component A, was obtained. The thus obtained component A had the following properties: a melt flow rate (MFR) of 3.3 g/10 min.; a density of 0.905 g/cm$^3$; an extraction with n-hexane at boil of 10.7 wt %; a Q value of 2.0; a TREF elution curve having a single peak corresponding to a temperature of 62° C., and also having a H/W ratio of 4 at that temperature; and an elution volume at 50° C. of 12 wt %.

Particulate Inorganic Filler (Component B)

Calcium carbonate having an average particle size of 1.0 μm and a bulk density of 0.4 g/cm$^3$ was prepared as a particulate inorganic filler which was to serve as component B.

Production of Filler-containing Resin Composition

The above ethylene-α-olefin copolymer (component A) and the particulate inorganic filler (component B) were mixed together with a Henschel mixer in such a manner as to obtain a mixture having a proportion of component A : component B=40:60 wt %. Then, 3 parts by weight of glyceryl triricinoleate (castor oil), which was to serve as component C, was added to and mixed with the above mixture per 100 parts by weight of the total amount of the components A and B. The resultant mixture was extruded with a biaxial kneader-extruder (having a screw diameter of γmm) at a temperature of 200° C., thereby obtaining a filler-containing resin composition in the form of pellets.

Forming

The pellets made of the filler-containing resin composition were subjected to the following forming:

The pellets were extruded at a temperature of 230° C. into a film by using an extruder (screw diameter: 40 mm; L/D: 24) and a T die (die width: 300 mm; lip width: 1.2 mm). The film was uniaxially stretched with short-interval hot drawing rolls at a drawing temperature of 85° C. and at a draw ratio of 2 times, thereby obtaining a gas-permeable film having a thickness of 20 to 30 μm.

The thus obtained stretched film was evaluated. The results of the evaluation are shown in Table 1.

EXAMPLES 2 and 3

Filler-containing resin compositions serving as other examples of the present invention were each produced in the same manner as that in EXAMPLE 1 except that, in these examples, component A, component B and other components having the properties shown in Table 1 were used. The resultant resin compositions were formed and evaluated as in EXAMPLE 1.

The results of the evaluation are also shown in Table 1.

COMPARATIVE EXAMPLES 1 to 3

Other resin compositions serving as comparative examples were obtained in the same manner as that in Example 1 except that component A was substituted by an ethylene-α-olefin copolymer prepared by using a Ziegler catalyst and having the properties shown in Table 1. The resin compositions were formed and evaluated as in EXAMPLE 1. The results of the evaluation are shown in Table 1.

duced in the following manner. This resin composition contained component A, component B (both being the same type as those used in EXAMPLE 1) and component C comprising glyceryl triricinoleate (castor oil), and additionally contained component D.

An ethylene-cyclic aminovinyl compound copolymer, which was to serve as component D, was prepared by continuously supplying an agitation autoclave type continuous reactor with the following substances: ethylene; 4-acryloyloxy-2,2,6,6-tetramethylpiperidine dissolved in ethyl acetate; and a catalyst comprising tertiary-butyl peroxypivalate dissolved in normal hexane, and causing copolymerization under a polymerization pressure of 2000 kg/cm$^2$ and a polymerization temperature of 200° C.

The thus obtained copolymer to serve as component D had a melt flow rate of 2.7 g/10 min., and contained 4-acryloyloxy-2,2,6,6-tetramethylpiperidine units which amounted to 7.0% of the total weight of that copolymer (0.99% of the total number of moles of that copolymer).

Production of Filler-containing Resin Composition 40 parts by weight of component A, 60 parts by weight of component B, and 3.3 parts by weight of component C were mixed together with a Henschel mixer. Then, 3 parts by weight of component D was added to and mixed with the above mixture. The resultant mixture was extruded with a uniaxial kneader-extruder (having a screw diameter of 65 mm) at a temperature of 200° C., thereby obtaining a filler-containing resin composition in the form of a pellet, which composition contained components A to C, and also contained

TABLE 1

|  | Example No. | | | Comparative Ex. No. | | |
| --- | --- | --- | --- | --- | --- | --- |
|  | 1 | 2 | 3 | 1 | 2 | 3 |
| Component A | | | | | | |
| MFR (g/10 min.) | 3.3 | 3.3 | 3.3 | 1.0 | 2.0 | 0.8 |
| Density (g/cm$^3$) | 0.905 | 0.905 | 0.905 | 0.920 | 0.900 | 0.925 |
| Hexene content (wt %) | 16 | 16 | 16 | 10 | 20 | 6.5 |
| TREF | | | | | | |
| Number of peaks | 1 | 1 | 1 | 2 | 2 | 2 |
| Peak temperature (°C.) | 62 | 62 | 62 | 65, 94 | 56, 94 | 70, 94 |
| H/W | 4 | 4 | 4 | —, — | —, — | —, — |
| Elution volume at 50° C. (%) | 12 | 12 | 12 | 31 | 49 | 28 |
| Q value | 2.0 | 2.0 | 2.0 | 3.9 | 3.2 | 3.5 |
| Component B | | | | | | |
| Average particle size (μm) | 1.0 | 1.0 | 1.0 | 1.0 | 1.0 | 1.0 |
| Bulk density (g/cm$^3$) | 0.4 | 0.4 | 0.4 | 0.4 | 0.4 | 0.4 |
| Ratio | | | | | | |
| Comp. A:Comp. B | 40:60 | 40:60 | 40:60 | 40:60 | 40:60 | 40:60 |
| Additives | | | | | | |
| Kind of Add. | (a) | (b) | (a) | (a) | (a) | (a) |
| Amount of Add. (parts by wt) | 3 | 3 | 3 | 3 | 3 | 3 |
| Film | | | | | | |
| Basis weight (g/m$^2$) | 19 | 18 | 28 | 19 | 19 | 29 |
| Properties | | | | | | |
| Tensile strength | | | | | | |
| MD breaking point (g/25 mm) | 1230 | 1200 | 2010 | 1160 | 1100 | 1180 |
| TD breaking point (g/25 mm) | 203 | 210 | 220 | 201 | 180 | 200 |
| Permeability (g/m$^2$ · 24 hrs) | 3980 | 3940 | 1520 | 1680 | 1510 | 650 |
| Elastic recovery (%) | 10 | 10 | 10 | 30 | 12 | 45 |
| Boid area ratio (%) | 10 | 10 | 10 | 5 | 4 | 4 |

Note:
(a) glyceril tri-ricinoleate
(b) glyceril tri-12-hydroxy stearate

EXAMPLE 4

Preparation of Copolymer of Ethylene and Cyclic Aminovinyl Compound (Component D)

Another filler-containing resin composition serving as another example of the present invention was pro- 4-acryloyloxy-2,2,6,6-tetramethylpiperidine units amounting to 0.22% of the total weight of the composition.

Forming

The pellets made of the filler-containing resin composition were subjected to the following forming:

The pellets were extruded at a temperature of 230° C. into a film by using an extruder (screw diameter: 40 mm; L/D: 24) and a T die (die width: 300 mm; lip width: 1.2 mm). The film was uniaxially stretched with short-interval hot drawing rolls at a drawing temperature of 85° C. and at a draw ratio of 3 times, thereby obtaining a gas-permeable film having a thickness of approximately 35 μm. During forming, the occurrence of smoking or chill roll staining was checked for visually.

The thus obtained oriented film was evaluated. The results of the check and the evaluation are shown in Table 2.

EXAMPLE 5

A filler-containing resin composition serving as another example of the present invention was produced in the same manner as that in EXAMPLE 4 except that, in this example, component A, component B and other components having the properties shown in Table 2 were used. The resultant resin compositions were formed and evaluated as in EXAMPLE 4.

The results of the evaluation are also shown in Table 2.

COMPARATIVE EXAMPLES 4 to 6

Other resin compositions serving as other comparative examples were obtained in the same manner as that in EXAMPLE 4 except that component A was substituted by an ethylene-α-olefin copolymer prepared by using a Ziegler catalyst and having the properties shown in Table 2, and that the mixing ratios shown in Table 2 were used. The resin compositions were formed into stretched films, which were evaluated as in Example 4. Example 5 contained, instead of component C, benzotriazole as an anti-weathering agent, and Example 6 contained no benzotriazole. The results of the evaluation are shown in Table 2.

TABLE 2

|  | Example No. |  | Comp. Ex. No. |  |  |
| --- | --- | --- | --- | --- | --- |
|  | 4 | 5 | 4 | 5 | 6 |
| Component A | | | | | |
| MFR (g/10 min.) | 3.3 | 1.5 | 0.8 | 0.8 | 0.8 |
| Density (g/cm$^3$) | 0.905 | 0.924 | 0.924 | 0.924 | 0.924 |
| Hexene content (wt %) | 16 | 6 | 7 | 7 | 7 |
| TREF | | | | | |
| Number of peaks | 1 | 1 | 2 | 2 | 2 |
| Peak temperature (°C.) | 62 | 87 | 83, 93 | 83, 93 | 83, 93 |
| H/W | 4 | 27.1 | *1, 9.3 | —, 9.3 | —, 9.3 |
| Elution volume at 50° C. (%) | 12 | 0 | 3.3 | 3.3 | 3.3 |
| Q value | 2.0 | 2.0 | 3.8 | 3.8 | 3.8 |
| Component B | | | | | |
| Average particle size (μm) | 1.0 | 1.0 | 1.0 | 1.0 | 1.0 |
| Bulk density (g/cm$^3$) | 0.4 | 0.4 | 0.4 | 0.4 | 0.4 |
| Component C | | | | | |
| MFR (g/10 min.) | 2.7 | 2.7 | 2.7 | — | — |
| Vinyl Compd. content (mol %) | 0.99 | 0.99 | 0.99 | — | — |
| Amount added (parts by wt) | 3.3 | 3.3 | 3.3 | — | — |
| Amount of Benzotriazol added (parts by wt) | — | — | — | 0.2 | — |
| Ratio | | | | | |
| Comp. A:Comp. C | 40:60 | 40:60 | 40:60 | 40:60 | 40:60 |
| Component D (Additives) | | | | | |
| Kind of Add. | (a) | (a) | (a) | (a) | (a) |
| Amount of Add. (parts by wt) | 3 | 3 | 3 | 3 | 3 |
| Film | | | | | |
| Basis weight (g/m$^2$) | 35 | 35 | 35 | 35 | 35 |
| Properties | | | | | |
| Tensile strength | | | | | |
| MD breaking point (g/25 mm) | 1830 | 1250 | 1150 | 1080 | 1100 |
| Permeability (g/m$^2$ · 24 hrs) | 5150 | 8430 | 6320 | 4810 | 6150 |
| Weathering property (hr) | 500 | 420 | 300 | 250 | 50 |
| Wet tension (dyne) | 46 | 47 | 45 | 32 | 38 |
| Boid area ratio (%) | 12 | 14 | 6 | 6 | 6 |
| Dirty on roll at film molding | none | none | none | found | none |
| Smoking at film molding | none | none | none | found | none |

Note:
*1 not measured
(a) glyceril tri-ricinoleate

As has been described above, a filler-containing resin composition according to the present invention is advantageously usable to form a thin gas-permeable formed body that is stretched with sufficient properties, and that is capable of exhibiting excellent elastic recovery, strength, hand and weathering resistance, and very excellent gas-permeability. Therefore, such a thin gas-permeable formed body may be used as a film material that serves as sanitary material for producing diapers, sanitary goods, medical wear, etc. A formed body formed of a filler-containing resin composition according to the present invention which additionally contains component D has further improved weathering resistance and printability, and may be used as a material for producing sheets for outdoor uses, such as a sheet for water-proofing and protecting wood structures, or a sheet for heat-insulation and protection of trees, etc.

What is claimed is:

1. A filler-containing resin composition, said composition containing component A and component B at a proportion wherein said component A is contained in a first amount and said component B is contained in a second amount, said first amount being within a range of from 20 to 80% and said second amount being within a range of from 80 to 20% of the weight of said component A and the weight of said component B, respectively, with respect to the total weight of said component A and said component B, said component A comprising a copolymer of ethylene and olefin having a carbon number of not less than 3, said component A having the following properties (a) to (d):
(a) a melt flow rate (MFR) of 0.01 to 20 g/10 min.;
(b) a density D of not more than 0.935 g/cm$^3$;
(c) a single peak of elution volume indicated by an elution curve obtained by temperature rising elution fractionation (TREF), said peak corresponding to a temperature within a range of from 30° to 100° C., and said elution curve satisfying a relationship in which the ratio H/W is not less than 1 when H represents the height of said peak and W represents the width of said elution curve at half of said height H; and
(d) an elution volume Y (in percentage of the weight thereof with respect to the total weight of said component A) at an elution temperature of 50° C. in temperature rising elution fractionation, said elution volume Y satisfying the following condition ① or ②:
① Y≦−4500D+4105 when the density D of said component A is less than 0.91 g/cm$^3$, but Y≦100; or
② Y≦10 when the density D of said component A is not less than 0.91 g/cm$^3$,
said component B comprising a particulate inorganic filler having an average particle size of not more than 10 μm, and a bulk density within a range of from 0.1 to 0.7 g/cm$^3$.

2. A resin composition according to claim 1 wherein said component A is contained in a first amount within a range from 30 to 70% by weight, and said component B is contained in a second amount within a range of from 30 to 70% by weight.

3. A resin composition according to claim 1 wherein said component A is contained in a first amount within a range of from 35 to 60% by weight, and said component B is contained in a second amount within a range of from 40 to 65% by weight.

4. A resin composition according to claim 1 wherein said component A has a melt flow rate of 0.1 to 10 g/10 min.

5. A resin composition according to claim 1 wherein said component A has a melt flow rate of 0.5 to 5 g/10 min.

6. A resin composition according to claim 1 wherein said component A has a density of 0.86 to 0.930 g/cm$^3$.

7. A resin composition according to claim 1 wherein said component A has a density of 0.88 to 0.925 g/cm$^3$.

8. A resin composition according to claim 1 wherein said component A has a density of not less than 0.88 and less than 0.910 g/cm$^3$.

9. A resin composition according to claim 1 wherein said component A has a single peak of elution volume indicated by an elution curve obtained by temperature rising elution fractionation, which peak corresponds to a temperature within a range of from 35° to 85° C.

10. A resin composition according to claim wherein said component A has a single peak of elution volume indicated by an elution curve obtained by temperature rising elution fractionation, which peak corresponds to a temperature within a range of from 40° to 70° C.

11. A resin composition according to claim wherein said component A further has a Q value of not more than 4.

12. A resin composition according to claim 1 further containing component C comprising a dispersing agent for said particulate inorganic filler, said component C being contained in said resin composition in an amount of 0.1 to 15 parts by weight per 100 parts by weight of the total amount said component A and said component B.

13. A resin composition according to claim 12 wherein said dispersing agent comprises an ester of a saturated or unsaturated fatty acid having 9 to 40 carbon atoms.

14. A resin composition according to claim 12 wherein said dispersing agent comprises a glyceryl hydroxy saturated or unsaturated fatty-acid ester.

15. A resin composition according to claim 12 wherein said dispersing agent comprises glyceryl triricinoleate or glyceryl tri-12-hydroxystearate.

16. A resin composition according to claim 1 further containing component D comprising a copolymer of ethylene and a cyclic aminovinyl compound, said cyclic aminovinyl compound being expressed by the following general formula (I):

$$\begin{array}{c} R^1\ R^2\ O \qquad\qquad CH_2-C(CH_3)_2 \\ |\ \ |\ \ \| \qquad\qquad / \qquad\qquad\backslash \\ H-C=C-C-O-CH \qquad N-R^3 \\ \backslash \qquad\qquad / \\ CH_2-C(CH_3)_2 \end{array} \quad (I)$$

where R$^1$ and R$^2$ represent a hydrogen atom or a methyl group, and R$^3$ represents a hydrogen atom or an alkyl group having to 4 carbon atoms,
said component D being contained in said resin composition in an amount at which cyclic aminovinyl compound units in said copolymer serving as said component D weigh from 0.05 to 5% of the total weight of said resin composition.

17. A resin composition according to claim wherein said component D is contained in said resin composition in an amount at which cyclic aminovinyl compound units in said copolymer serving as said component D weigh from 0.1 to 1% of the total weight of said resin composition.

18. A resin composition according to claim wherein said cyclic aminovinyl compound comprises 4-acryloyloxy-2,2,6,6-tetramethylpiperidine 19. A resin composition according to claim 16 further containing component C comprising a dispersing agent for said particulate inorganic filler, said component C being contained in said resin composition in an amount of 0.1 to 15 parts by weight per 100 parts of the total weight of said component A and said component B.

20. A filler-containing resin composition, said composition containing component A and component B at a proportion wherein said component A is contained in a first amount and said component B is contained in a second amount, said first amount being within a range of from 20 to 80% and said second amount being within a range of from 80 to 20% of the weight of said component A and the weight of said component B, respectively, with respect to the total weight of said component A and said component B, said component A comprising a copolymer of ethylene and olefin having a carbon number of 4 to 12, said component A having the following properties (a) to (d):
- (a) a melt flow rate (MFR) of 0.1 to 10 g/10 min.;
- (b) a density D within a range from 0.86 to 0.930 g/cm$^3$;
- (c) a single peak of elution volume indicated by an elution curve obtained by temperature rising elution fractionation (TREF), said peak corresponding to a temperature within a range from 35° to 85° C., and said elution curve satisfying a relationship in which the ratio H/W ranges from 1 to 20 when H represents the height of said peak and W represents the width of said elution curve at half of said height H; and
- (d) an elution volume Y (in percentage of the weight thereof with respect to the total weight of said component A) at an elution temperature of 50° C. in temperature rising elution fractionation, said elution volume Y satisfying the following condition ① or ②:
① $Y \leq -4500D + 4238$ when the density D of said component A is less than 0.91 g/cm$^3$, but $Y \leq 100$; or
② $Y \leq 7$ when the density D of said component A is not less than 0.91 g/cm$^3$,
said component B comprising a particulate inorganic filler having an average particle size of not more than 10 μm, and a bulk density within a range of from 0.2 to 0.6 g/cm$^3$.

21. A filler-containing resin composition, said composition containing component A and component B at a proportion wherein said component A is contained in a first amount and said component B is contained in a second amount, said first amount being within a range of from 20 to 80% and said second amount being within a range of from 80 to 20% of the weight of said component A and the weight of said component B, respectively, with respect to the total weight of said component A and said component B, said component A comprising a copolymer of ethylene and olefin having a carbon number of 6 to 10, said component A having the following properties (a) to (d):
- (a) a melt flow rate (MFR) of 0.5 to 5 g/10 min.;
- (b) a density D within a range from 0.88 to 0.925 g/cm$^3$;
- (c) a single peak-of elution volume indicated by an elution curve obtained by temperature rising elution fractionation (TREF), said peak corresponding to a temperature within a range from 40° to 70° C., and said elution curve satisfying a relationship in which the ratio H/W ranges from 1 to 15 when H represents the height of said peak and W represents the width of said elution curve at half of said height H; and
- (d) an elution volume Y (in percentage of the weight thereof with respect to the total weight of said component A) at an elution temperature of 50° C. in temperature rising elution fractionation, said elution volume Y satisfying the following condition ① or ②:
① $Y \leq -4500D + 4238$ when the density D of said component A is less than 0.91 g/cm$^3$, but $Y \leq 100$; or
② $Y \leq 7$ when the density D of said component A is not less than 0.91 g/cm$^8$,
said component B comprising a particulate inorganic filler having an average particle size of not more than 10 μm, and a bulk density within a range of from 0.3 to 0.5 g/cm$^3$.

* * * * *